Oct. 4, 1938.  W. GRUND  2,132,027
GAUGE FOR MASONRY JOINTS
Filed July 21, 1936
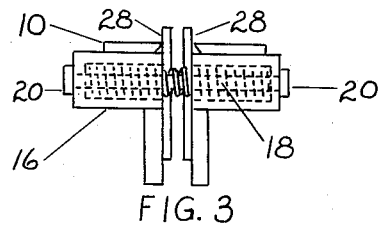
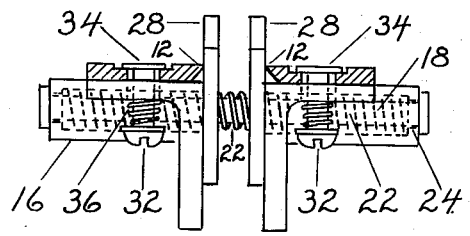
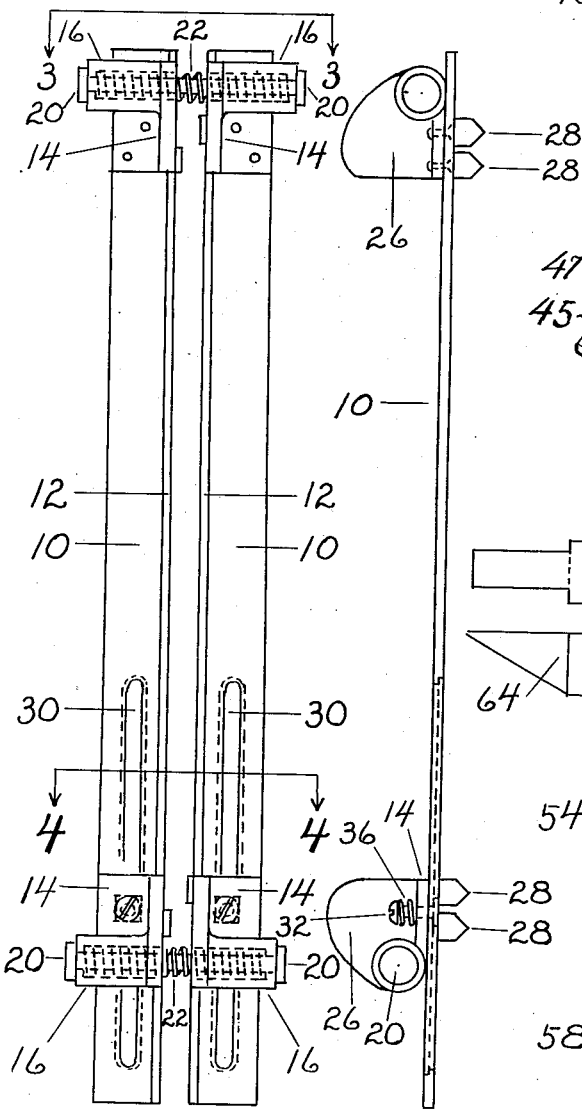
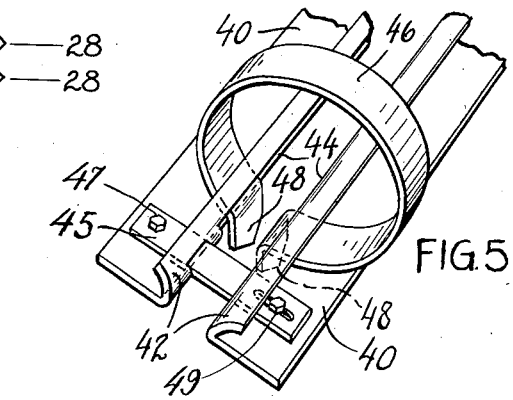
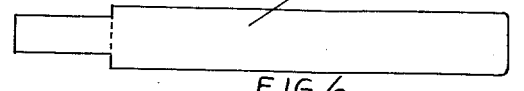
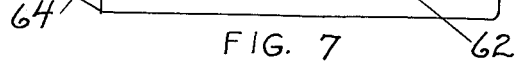
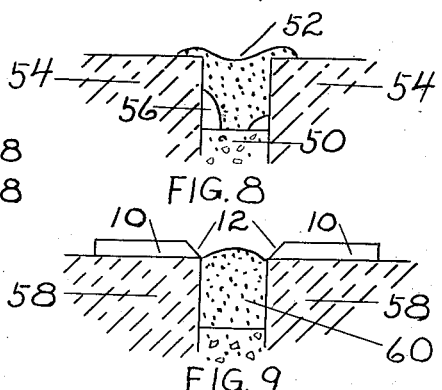
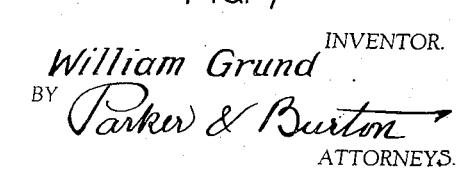
INVENTOR.
William Grund
BY Parker & Burton
ATTORNEYS.

Patented Oct. 4, 1938

2,132,027

UNITED STATES PATENT OFFICE 2,132,027

GAUGE FOR MASONRY JOINTS

William Grund, Detroit, Mich.

Application July 21, 1936, Serial No. 91,728

9 Claims. (Cl. 72—128)

This invention relates to improvements in the method of and apparatus for filling joints between masonry blocks and other structural units.

It has been the practice in pointing operations on masonry and other structural work to fill the joints or crevices between the structural units in a manner which spread the filler material upon the outer exposed edges of the joints and therefore required additional steps to remove the compound from the surrounding surfaces after the joint was filled. Furthermore, although an apparent excess of filler compound was introduced into the joint, the manner of introducing the filler into the joint and the subsequent step of removing the excess filler prevented the proper filling of the joint by causing the formation of hidden voids in the filler material. This not only permitted the filler to recede in the joint but also rendered the joint permeable to moisture and gave rise to injurious and dangerous conditions. This decreased the life of the structure and increased the maintenance costs.

The practice in the past has simply been to introduce filler compound into the joint without any particular care as to whether it spilled or spread upon the adjacent exposed surfaces of the structure. The filler compound was generally introduced into the joint until it was over-filled. The excess filler was then removed by cutting or scraping away the excess with a suitable tool. This had the tendency, particularly in connection with filler material of adhesive character, of pulling out some of the filler compound intended to be retained in the joint. This produced voids in the body of the filler compound which could not be seen and therefore could not be repaired at that time. After the excess of compound had been removed, pressure was applied to the exposed part of the filler compound to press it into the joint and give it a finished appearance. This tended to spread part of the filler compound upon adjacent exposed surfaces, and this in addition to that spilled or deposited thereon during the actual filling operation had to be removed by scraping and cleaning operations before the work would be satisfactory. This added to time and labor and ultimately to the cost for each job.

A primary object of this invention is to provide a novel method of filling joints and a novel apparatus for assisting in this method both of which insure that the joint is properly filled and thereby relieve the caulker of the necessity of cleaning the exposed surfaces after the joint is filled. This speeds the work and retains the exposed parts of the structure in original condition. Several steps are thus eliminated from the work and the cost is accordingly reduced.

Another object of this invention is to provide a novel device or gauge which assists the pointer in keeping the joint properly filled and the surrounding surfaces clean. The gauge is adapted to fit any width of joint and is adjustable for different lengths of joints. The gauge may be used upon horizontal or vertical surfaces wherever pointing or caulking operations are necessary and in either case the gauge is self-supporting upon the surface of the structure.

More specifically, the gauge comprises two parallel, relatively long elements or bars which are adapted to be secured to the structural units along the adjacent edges of the joints. The gauge is provided with gripping elements which enter the joint and act to hold or secure the bars in place. These elements are arranged to expand into engagement with the side walls of the adjoining structure units and can accommodate themselves to any width of joint. The bars are movable with these elements and automatically assume a spaced relation corresponding to the width of the joint. Another meritorious feature of the invention resides in the adjustable character of these gripping elements. They are designed for longitudinal adjustment so that the bars may be supported in joints of varying lengths.

Other objects, advantages and meritorious features of this invention will more fully appear from the following specification, appended claims and accompanying drawing, wherein:

Fig. 1 is a top plan view of the gauge with parts in dotted lines to indicate certain interior structure of the gauge, Fig. 2 is a side view of the gauge shown in Fig. 1, Fig. 3 is an end view of the gauge looking in the direction indicated in Fig. 1 by the arrow designations 3—3, Fig. 4 is a cross-sectional view, slightly enlarged, along line 4—4 in Fig. 1, Fig. 5 is a perspective view of a modified arrangement for coupling the guide bars together and securing them on either side of a joint, Fig. 6 is a top view of a tool which may be used in jointing operations, Fig. 7 is a side view of the tool shown in Fig. 6.

Fig. 8 is a cross-sectional view of a joint showing the difficulties encountered by employing the old method of filling the joint, Fig. 9 is a cross-sectional view of a joint showing the advantages of employing a gauge of the character described herein for caulking or pointing operations.

Referring more specifically to the drawing, the joint gauge comprises two parallel relatively flat members or bars 10. The adjacent edges of these bars are beveled at 12. As illustrated in Fig. 8 these bars are adapted to extend along either side of the joint with their beveled edges extending substantially even with the edges of the spaced structural units forming the joint.

The bars 10 are coupled together but are yieldingly spaced from one another by a novel device provided adjacent each end of the bars. Each device comprises a pair of brackets 14 of general L-shaped construction. These brackets are secured upon the upper surfaces of the bars in positions opposite one another as shown in Fig. 1. Each bracket has a housing or cylinder 16 which may be integrally formed with the bracket. These cylinders face opposite one another and a pin 18 extends through these cylinders joining one bar to the other. The ends of the pin 18 are headed at 20 so as to prevent the pin from being drawn through these cylinders in either direction. The interior of each cylinder is oversize the diameter of the pin providing space for receiving a coil spring 22. This spring extends substantially the length of the pin and bears at each end upon a reduced portion 24 at the opposite extreme ends of the cylinders 16. The coil spring is under compression and forces the brackets away from one another against the heads of the pin 18.

Each bracket has an upright section 26. These sections enable the operator to grasp the gauge at both ends and apply or direct the gauge to a joint. Secured to the adjacent faces of these sections and extending between the bars 10 are gripping devices or dogs 28 which are adapted to enter a joint or crevice and engage the side wall of the joint. Each bracket carries a dog and as shown in the drawing the dogs are slightly offset to one another so that the bars may be brought closer together. To secure the gauge in position about a joint, the dogs are brought together by pinching each pair of brackets together and introducing the dogs into the joint. Upon release of the brackets, the gripping dogs are expanded by the springs 22 into contacting engagement with the side wall surfaces of the adjoining structural units. The springs are strong enough to hold the gauge in a joint upon a vertical wall structure.

One of the devices yieldingly urging the bars 10 apart may be adjustable longitudinally of the bars. An adjustable device of this character is shown in the lower parts of Figs. 1 and 2. The device in the upper parts of these figures is fixed to the bars as by rivets. The adjustment of the lower device is accomplished by providing a slot 30 in each of the bars and slidably supporting one of the brackets 14 in each of these slots. Each slot is widened or recessed along the bottom face of the bars as indicated in Fig. 4. A connecting element or pin 32 extends through each of the slots and through the base of each of the brackets 14 of the device shown in the lower part of Figure 1. Each element 32 is provided with an enlarged square-shaped element 34 which rides in the recessed part of the slot as indicated in Fig. 4. A coil spring 36 encircles each element and acts to draw the bracket down upon the bar to hold the bracket in adjusted position. To adjust the device in the lower part of Fig. 1, the upright sections 26 are grasped by the operator and forced longitudinally along the slots. This varies the distances between the gripping dogs of the upper and lower devices and accommodates the gauge for joints of varying lengths.

A modified form of the invention is illustrated in Fig. 5. It comprises a pair of parallel guide members corresponding to the bars 10 in Fig. 1 and a spring metal element joining these members together and performing in addition the function of yieldingly gripping the walls of the joint to retain the members in place on a structure. Referring in detail to Fig. 5, the parallel guide members or bars 40 may be made of flat metal stock which can be shaped under pressure or dies to provide a backwardly curved marginal flange 42. The members are arranged with their marginal flanges extending adjacent one another as shown. These flanges correspond to the beveled edges 12 in Fig. 1.

Adjacent the base of each marginal section 42 and terminating inwardly of the end of each bar 40 is a slot 44. A spring metal element or band 46 is bent upon itself, and the ends are inserted under the marginal flanges and through the slots 44 as shown. The ends 48 of the element are bent to extend substantially vertically from the bottom faces of the guide members and function as gripping dogs similar to those described in connection with Figs. 1 to 4. The element 46 is under resilient compression when the gripping ends 48 are brought near one another for insertion in joints of normal widths. This acts to force the ends 48 into tight gripping engagement with the side walls of the joint. Each end of the element 46 is slidable longitudinally through the slots 44 for adjustment purposes. A similar spring metal unit may be provided at the other end of the guide members. By slidably adjusting these toward and away from each other, the gauge may be adjusted for joints of varying lengths. If desired, one of these units may be fixed to the guide members against longitudinal adjustment. To prevent the bars 40 from movement relative to one another, a transverse member 45 may be provided having one end fixed to one of the bars by a stud 47 while the other end is slidably secured to the other bar by a slot and stud construction 49.

In Fig. 8, a cross-sectional view of a joint illustrates the difficulties encountered by the old method of pointing. The joint was usually either partially or completely filled with a cement mortar, caulking compound, or other suitable substance 50. When it was partially filled with mortar the remainder of the joint was filled with filler compound 52, usually having elastic and adhesive qualities. The joint was usually filled until either the elastic compound or the mortar was apparently in excess of that needed for the joint and spread upon the exposed surfaces of structural units 54. The formation of concealed voids 56 are very probable. The excess compound was then removed by a cutting or scraping operation, usually by a putty knife or similar tool. In the case of adhesive filler compound the scraping action tended to draw or pull out part of the compound which should be retained in the joint. This tended not only to produce voids but to increase the size of the voids 56 already in the compound. After the scraping action, the remaining compound was worked back into the joint by a suitable tool to give it a finished appearance, but the concealed defects still remained.

In Fig. 9, a cross sectional view of a joint illustrates the advantages of the method embodying the principles of this invention. The parallel guide bars 10 of the joint gauge extend along the exposed edges of the structural units 58 with the beveled edges 12 terminating flush with the commencement of the joint. The gripping dogs 28 have been inserted into the joint and are expanded against the side walls of the structural units acting to hold the guide bars in place. The filler compound 60 is then introduced into the joint. A pressure or caulking gun may be used for this purpose if the character of the compound warrants it. If the excess filler compound tends to spread laterally, it will deposit on the beveled portion of the bars 10 without contacting the outer surfaces of the structural units.

A tool such as that illustrated in Figs. 6 and 7 having a working edge which can enter the joint between the bars of the gauge may now be employed. The tool is used to press the compound into the joint. If any of the excess compound spreads under the pressure of the tool it may be disregarded since it will be removed when the gauge is taken from the joint. If the tool illustrated in Figs. 6 and 7 is employed, the handle 62 is grasped by the operator so that the working face 64 of the tool contacts the top of the compound in the joint and extends substantially parallel thereto. By drawing the tool along the filled joint between the bars, the compound can be forced deep into the joint until all voids are closed. The excess filler, instead of being scraped away and wasted as described in the old method, is forced into the joint and insures that the joint is completely filled. When the tool is pressed along the top of the filler compound it may be worked with judicious pressure to give the rounded finished exterior shown in Fig. 9. After this operation the gauge is removed carrying with it any excess compound which has deposited upon its surface. No wiping or cleaning of the exposed surfaces of the structural units is necessary when the joint gauge is employed.

It is understood that the operation of filling the joint is the same in connection with the modification shown in Fig. 5. In this case the marginal flanges 42 receive the spread of the filler material and keep it from contacting the outer surfaces of the structural units.

What I claim is:

1. A gauge for filling joints between structural units comprising, in combination, a pair of members extending substantially parallel to one another, means carried by said members adapted to enter a joint, and means yieldingly urging said members and the means carried thereby away from one another a distance greater than the width of the joints to be filled whereby said means are yieldingly expanded into engagement with the side walls of a joint into which they are introduced.

2. A gauge for filling joints between adjacent structural units comprising, in combination, a pair of members extending substantially parallel to one another, means carried by said members adapted to enter a joint between two adjacent structural units, means for adjusting the position of said first means longitudinally along said members, and means yieldingly urging said members away from one another.

3. A gauge of the class described comprising, in combination, a pair of flat relatively long bars extending substantially parallel to one another and substantially in the same plane, a bracket on each of said bars, a pin extending between each of said brackets coupling the bars together, a coil spring encircling said pin and yieldingly separating said brackets and the bars from each other, and gripping elements carried by said brackets and extending angularly to the plane of said bars, said elements adapted to enter a joint between structural units and expand into engagement with the side walls thereof under tension of said spring.

4. A gauge of the class described comprising, in combination, a pair of flat relatively long bars extending substantially parallel to one another and substantially in the same plane, a bracket on each of said bars, a pin extending between each of said brackets coupling the bars together, a coil spring encircling said pin and yieldingly separating said brackets and the bars from each other, gripping elements carried by said brackets and extending angularly to the plane of said bars, said elements adapted to enter a joint between structural units and expand into engagement with the side walls thereof under tension of said spring, and means for slidably securing said brackets to their respective bars for longitudinal adjustment therealong.

5. The method of filling the space between adjacent structural units with filler material which comprises placing two members upon the outer surfaces of said units with the adjacent edges extending substantially even with the adjacent edges of said units, introducing filler material into said space in excess of the amount the space will contain, applying pressure to the outer surface of said filler material to force the same into close contact with the adjacent surfaces of said units, and removing said members including any material which has spread thereupon during the filling and forced application of the filler material into the space.

6. A gauge of the class described comprising a pair of substantially parallel guide members, means coupling said members together but yieldingly spacing the same from one another comprising a flexible element looped upon itself with the loop disposed on one side of said members and the free ends of the element on the other side of the members, said flexible element acting to yieldingly separate said members from each other.

7. A gauge for filling joints between adjacent structural units comprising, in combination, a pair of members extending substantially parallel to one another, elements carried by said members adapted to enter a joint between two adjacent structural units to position said members upon opposite sides of the joint, and means for adjusting said elements longitudinally along said members for different lengths of joints.

8. A gauge for filling joints between adjacent structural units comprising, in combination, a pair of members extending substantially parallel to one another, spaced means coupling said members together in side by side relationship, elements carried by said coupling means adapted to enter a joint between two structural units to position said members upon opposite sides of the joint, and means for adjusting one of said coupling means longitudinally along said members to vary the distance between the elements carried by said coupling means.

9. A gauge for filling joints comprising, in combination, a pair of members extending in the same plane in spaced parallel edge to edge relationship, elements projecting laterally from one side of each of said members at spaced points along their adjacent edges and adapted to be inserted into a joint between structural units to position the members upon opposite sides of the joint, said elements being of relatively narrow width and constituting the only parts of the gauge entering a joint whereby substantially all of the area of the side walls of a joint upon which the gauge is used is exposed for contact with filler material introduced between the members into the joint.

WILLIAM GRUND.